US010519039B2

(12) United States Patent
Le Godec et al.

(10) Patent No.: US 10,519,039 B2
(45) Date of Patent: Dec. 31, 2019

(54) MECHANOCHEMICAL PROCESS FOR THE PRODUCTION OF BP, $B_{12}P_2$ AND MIXTURES THEREOF, IN PARTICULAR AS NANOPOWDERS (71) Applicants: UNIVERSITE PIERRE ET MARIE CURIE (PARIS 6), Paris (FR); CENTRE NATIONAL DE LA RECHERCHE SCIENTIFIQUE (CNRS), Paris (FR); UNIV PARIS XIII PARIS-NORD VILLETANEUSE, Villetaneuse (FR)

(72) Inventors: Yann Le Godec, Paris (FR); Vladimir A. Mukhanov, Paris (FR); Vladimir L. Solozhenko, Paris (FR); Petr S. Sokolov, Paris (FR); Dominique Vrel, Parmain (FR)

(73) Assignees: UNIVERSITE PIERRE ET MARIE CURIE (PARIS 6), Paris (FR); CENTRE NATIONAL DE LA RECHERCHE SCIENTIFIQUE (CNRS), Paris (FR); UNIV PARIS XII-NORD VILLETANEUSE, Villetaneuse (FR)

( * ) Notice: Subject to any disclaimer, the term of this patent is extended or adjusted under 35 U.S.C. 154(b) by 30 days.

(21) Appl. No.: 15/575,028

(22) PCT Filed: Apr. 8, 2016

(86) PCT No.: PCT/EP2016/057731
§ 371 (c)(1),
(2) Date: Nov. 17, 2017

(87) PCT Pub. No.: WO2016/184608
PCT Pub. Date: Nov. 24, 2016

(65) Prior Publication Data
US 2018/0148336 A1 May 31, 2018

(30) Foreign Application Priority Data

May 20, 2015 (EP) .................................. 15305763

(51) Int. Cl.
*C01B 25/08* (2006.01)
*C01B 35/10* (2006.01)

(52) U.S. Cl.
CPC ............ *C01B 25/084* (2013.01); *C01B 35/10* (2013.01)

(58) Field of Classification Search
CPC ............................. C01B 25/084; C01B 35/10
See application file for complete search history.

(56) References Cited

U.S. PATENT DOCUMENTS 2,966,424 A   12/1960  Ruehrwein et al.
3,260,571 A    7/1966  Gruber
(Continued)

FOREIGN PATENT DOCUMENTS

EP    1564820 A1    8/2005
EP    2098481 B1   11/2011
(Continued)

OTHER PUBLICATIONS

Ananthanarayanan et al., "Synthesis of Single Crystal Boron Phosphide," Journal of Crystal Growth, vol. 20, 1973, pp. 63-67.
(Continued)

*Primary Examiner* — Jun Li
(74) *Attorney, Agent, or Firm* — Birch, Stewart, Kolasch & Birch, LLP (57) ABSTRACT

The present invention relates to a process for the preparation of a boron phosphide, more specifically BP and/or $B_{12}P_2$, comprising the mechanochemical reaction of boron phosphate ($BPO_4$) with at least one alkaline earth metal (EA). In particular, the process of the invention allows for the selective preparation of either BP or $B_{12}P_2$ with more than 95%

(Continued)

purity, through the reduction of boron phosphate (BPO$_4$) with at least one alkaline earth metal (EA) according to reaction (1) for BP and according to reaction (2) for B$_{12}$P$_2$: BPO$_4$+4 EA→BP+4 EA(O) (1) 2BPO$_4$+5 (EA)B$_2$+3 EA→B$_{12}$P$_2$+8 EA(O) (2). The present invention further relates to boron phosphide powders, in particular BP or B$_{12}$P$_2$ powders, of nanometric or micrometric size.

14 Claims, 4 Drawing Sheets

(56) References Cited

U.S. PATENT DOCUMENTS

| | | | | |
|---|---|---|---|---|
| 5,066,441 | A * | 11/1991 | Gerard | A61K 9/2009 |
| | | | | 23/293 R |
| 2012/0165410 | A1* | 6/2012 | Dodd | A61K 9/145 |
| | | | | 514/569 |
| 2014/0305344 | A1* | 10/2014 | Barralet | A61L 24/02 |
| | | | | 106/691 |
| 2015/0005156 | A1 | 1/2015 | Dash et al. | |
| 2017/0022061 | A1* | 1/2017 | Le Godec | C01B 25/084 |
| 2017/0203965 | A1* | 7/2017 | Luan | C01B 25/084 |

FOREIGN PATENT DOCUMENTS

| | | |
|---|---|---|
| EP | 2886515 A1 | 6/2015 |
| GB | 931336 A | 7/1963 |
| WO | WO 03/065465 A2 | 8/2003 |

OTHER PUBLICATIONS

Brunauer et al., "Adsorption of Gases in Multimolecular Layers," J. Am. Chem. Soc., vol. 60, Feb. 1938, pp. 309-319.

Cueilleron et al., "Crystalline Boron Phosphide," Bulletin de la Societe Chimique de France, vol. 2, 1965, pp. 402-404 (4 Total Pages), with an English abstract, XP008169314.

Dalui et al., "Boron Phosphide Films Prepared by Co-evaporation Technique: Synthesis and Characterization," Thin Solid Films, vol. 516, No. 15, Jun. 2008 (Available online Oct. 2, 2007), pp. 4958-4965, XP022622329.

Feng et al., "Low Temperature Synthesis of Boron Phosphide Nanocrystals," Materials Letters, vol. 59, Nos. 8-9, Apr. 1, 2005 (Available online Dec. 10, 2004), pp. 865-867, XP027745289.

Fernández-Bertran, "Mechanochemistry: An Overview," Pure Appl. Chem., vol. 71, No. 4, 1999, (Plenary lecture presented at the 3rd International Congress of the Cuban Chemical Society, Havana, Cuba, Dec. 1-4, 1998), pp. 581-586.

International Union of Pure and Applied Chemistry, "Compendium of Chemical Terminology Gold Book," Version 2.3.3, Feb. 24, 2014, pp. 1-1622 (1670 Total Pages).

Konôpka et al., "Mechanochemistry and Thermochemistry are Different: Stress-Induced Strengthening of Chemical Bonds," Physical Review Letters, vol. 100, Mar. 21, 2008, pp. 115503-1 to 115503-4.

Mukhanov et al., "Self-Propagating High-Temperature Synthesis of Boron Phosphide," Journal of Superhard Materials, vol. 35, No. 6, 2013 (Nov. 1, 2013), pp. 415-417, XP002724252.

Mukhanov et al., "Self-Propagating High-Temperature Synthesis of Boron Subphosphide B$_{12}$P$_2$," Journal of Superhard Materials, vol. 36, No. 1, 2014 (Jan. 1, 2014), pp. 18-22, XP055228717.

Slack et al., "Some Crystallography, Chemistry, Physics, and Thermodynamics of B$_{12}$O$_2$, B$_{12}$P$_2$, B$_{12}$As$_2$, and Related Alpha-boron Type Crystals," Journal of Physics and Chemistry of Solids, vol. 75, 2014 (Available online Mar. 29, 2014), pp. 1054-1074.

Solozhenko et al., "Boron Phosphide Under Pressure: In situ Study by Raman Scattering and X-ray Diffraction," Journal of Applied Physics, vol. 116, 2014 (Published online Jul. 15, 2014), pp. 033501-1 to 033501-5 (6 Total Pages), XP055228718.

Sugimoto et al., "Size-controlled Growth of Cubic Boron Phosphide Nanocrystals," RSC Advances, vol. 5, No. 11, 2015 (Dec. 24, 2014), pp. 8427-8431, XP055228943.

Takacs, "Mechanochemistry and the Other Branches of Chemistry: Similarities and Differences," Acta Physica Polonica A, vol. 121, No. 3, 2012, pp. 711-714.

Williamson et al., "X-Ray Line Broadening from Filed Aluminium and Wolfram," Acta Metallurgica, vol. 1, Jan. 1953, pp. 22-31.

Written Opinion of the International Searching Authority and International Search Report (forms PCT/ISA/237 and PCT/ISA/210), dated Jun. 3, 2016, for International Application No. PCT/EP2016/057731.

* cited by examiner

MECHANOCHEMICAL PROCESS FOR THE PRODUCTION OF BP, $B_{12}P_2$ AND MIXTURES THEREOF, IN PARTICULAR AS NANOPOWDERS

FIELD OF THE INVENTION

The present invention concerns a safe, convenient, fast and low cost process for the production of boron phosphides (BP and/or $B_{12}P_2$).

BACKGROUND OF THE INVENTION

Boron phosphides (BP and $B_{12}P_2$) are desirable due to superior thermal stability (up to 1400 K in air), excellent chemical stability and high hardness, suitable for use as a promising abrasive material, which may be utilized for a wide range of engineering applications. The main limitation for the wide use of BP and $B_{12}P_2$ is the lack of relatively simple and economical methods for their production.

Polycrystalline boron phosphide powders were traditionally synthesized by direct reaction of the elemental boron and phosphorus in sealed silica tubes under a few atmospheres phosphorus pressure and heating (1400 K at least) for a prolonged period of several hours. Also, BP powder has been prepared by solvothermal co-reduction of a boron tribromide-phosphorus trichloride using metallic sodium as a reductant. Boron phosphide single crystals have also been grown by crystallization from metal solutions, or by chemical vapour transport reaction with sulphur. The main disadvantages of these methods are: the use of toxic and aggressive reagents, rather complicated technical implementation, high labour intensity and time consumption.

Recently, a self-propagating high-temperature synthesis of boron phosphides according to the following reactions has been developed (see Mukhanov et al., Journal of Superhard Materials 2013, 35, 6, 415-417 for BP, Mukhanov et al., Journal of Superhard Materials 2014, 36, 1, 18-22 for $B_{12}P_2$):

$$BPO_4 + 4Mg \rightarrow BP + 4MgO \quad (1)$$

$$2BPO_4 + 5MgB_2 + 3Mg \rightarrow B_{12}P_2 + 8MgO \quad (2)$$

These methods provide a simple, convenient and low-cost access to BP and $B_{12}P_2$, starting from a widely available boron containing reagent (boron phosphate $BPO_4$ is the third boron containing substance (after sodium borate $Na_2B_4O_7$ and boric acid $H_3BO_3$), and is commercially available (CAS Number: 13308-51-5).

However, this self-propagating high-temperature synthesis requires very high initiation temperatures (around 1000 K). Of note, even though the mixed reagents may be compressed into pellets or ingots prior to heating, such as described for instance in EP 2886515, the chemical reaction actually occurs only during heating. The mechanical energy provided by compression to the system is insufficient to initiate the reaction. In these documents, compression is only a way to ensure a good contact between the different reactants Indeed, in a self-propagating high-temperature synthesis, heating at high temperature (typically 1000K) is an essential feature for initiating the chemical reaction, and comes with side-reactions in particular through partial oxidation by air oxygen, resulting in a relatively low yield of the desired product (around 35% yield for BP, 50-75% for $B_{12}P_2$). Moreover, the process does not allow controlling of the particle size of the obtained boron phosphide powder.

Indeed, boron phosphide powders with a particle size of less than 60 nm are of particular interest as it is envisioned that such powders would lead, after sintering, to materials which could compete with diamond as super-hard materials.

There is therefore a need for a simple, convenient, low-cost and tunable process for the preparation of boron phosphides, which would in particular allow production of BP and/or $B_{12}P_2$ powders with a controlled size of the boron phosphides particles thus obtained, depending on the process parameters.

SUMMARY OF THE INVENTION

The present invention overcomes the drawbacks of the prior art through the use of mechanochemical reaction of boron phosphate ($BPO_4$) with at least one alkaline earth metal (EA).

In the art and in the present invention, mechanochemistry is understood as a chemical reaction induced by the direct absorption of mechanical energy (see in particular Compendium of chemical terminology Gold Book, version 2.3.3. of Feb. 24, 2014, page 903). More particularly, mechanochemistry is a branch of chemistry which is concerned with chemical and physico-chemical transformations of substances in all states of aggregation produced by the effect of mechanical energy (see G. Heinicke, Tribochemistry, Akademie-Verlag, Berlin, 1986).

It should be emphasized that mechanochemistry and thermochemistry reactions are different. Indeed, some reactions, in particular some chemical reactions involving reagents in solid phase, are possible through thermochemical phenomena but not through mechanochemistry, and vice versa. In addition, the processes involved in mechanochemical reactions are not yet completely understood, so that it is difficult to predict the outcome of a mechanochemical reaction (see in particular Fernandez-Bertran Pure Appl. Chem. 1999, 71, 4, 581-586, Takacs Acta Physica Polonica A 2012, 121, 3, 711-714 and Nonôpka et al. Physical Review Letters 2008, 100, 115503).

However, the Inventors have demonstrated that it is possible to obtain a boron phosphide, more specifically BP and/or $B_{12}P_2$, through mechanochemical reaction of boron phosphate ($BPO_4$) with at least one alkaline earth metal (EA). Such a process, provided that enough mechanical energy is furnished to the system, is particularly simple, since it may be carried out at room temperature without any external thermal heating. As a result, the process of the invention avoids side reactions such as undesired partial oxidation by air oxygen (in particular of the earth metal), thus leading to high yields (such as around 75%), and can be considered as a low-energy process.

The process according to the invention thus affords boron phosphides, more specifically BP and/or $B_{12}P_2$, in a simple and economical manner using readily available, inexpensive and safe starting materials in a very rapid manner, thereby overcoming the deficiencies of prior art. Moreover, the process of the invention, through appropriate choice of reaction conditions, allows controlling the particle size of the boron phosphides, which are obtained as powders.

In a first aspect, the present invention therefore concerns a process for the preparation of a boron phosphide, more specifically BP and/or $B_{12}P_2$, comprising the mechanochemical reaction of boron phosphate ($BPO_4$) with at least one alkaline earth metal (EA).

In another aspect, the present invention also concerns a boron phosphide, more specifically BP and/or $B_{12}P_2$, in particular as a powder having a particle size of less than 200 nm or 100 nm, preferably less than 60 nm or 50 nm.

Definitions

As used herein, "consists essentially of" or "essentially consists of" means that the concerned substance comprises at least 99% by weight, preferably 99.5% by weight, even more preferably 99.8% by weight of the listed constituents, the remaining being impurities. For instance, "the boron phosphide of the invention, in particular the boron phosphide powder of the invention, consists essentially of BP and/or $B_{12}P_2$" means that the boron phosphide of the invention comprises at least 99% by weight, preferably 99.5% by weight, even more preferably 99.8% by weight of BP and/or $B_{12}P_2$.

As used herein, "a boron phosphide" refers to BP (boron phosphide), $B_{12}P_2$ (boron subphosphide) or mixtures thereof.

In the present invention, unless otherwise stated, when it is referred to a numerical range, the lower and higher values indicated are included in the range. For instance, unless otherwise stated, when a distance d is of between 5 and 50 nm, then d may in particular be 5 and 50 nm.

In the present invention, the purity of the solids is measured by energy dispersive X-ray (EDX) microanalysis. Quantitative EDX microanalysis is in particular used to assess the stoichiometry of the obtained solids.

In the present invention, the particle size of the produced powders is preferably calculated from the width of X-ray diffraction lines using Williamson-Hall method (see Williamson et al. *Acta Metall.*, 1953, vol. 1, pp. 22-31).

As used herein, an "alkaline earth metal" is a periodic table group 2 metal selected from beryllium (Be), magnesium (Mg), calcium (Ca), strontium (Sr), barium (Ba) and radium (Ra), preferably selected from beryllium (Be), magnesium (Mg), calcium (Ca), strontium (Sr) and barium (Ba).

As used herein, an alkali is a periodic table group I element such as lithium (Li), sodium (Na), potassium (K), rubidium (Rb), cesium (Cs) or francium (Fr), preferably lithium (Li), sodium (Na) or potassium (K).

As used herein, a "high-energy mill" is understood as a rotative device (a mill) able to provide high mechanical energies, typically through gravitational accelerations of 50-100 g (g=9.8 m/s$^2$). The energy density in high-energy mills is 100 to 1000 higher than the energy density in conventional milling equipments.

For instance, a high-energy ball-mill provides a rotation speed of 500 rpm or higher through appropriate choice of parameters such as the number and weight of the ball(s), the composition of the balls and of the mill, the rotation speed of the mill, etc. . . . .

Other devices like rotor mills with hammer Fritsch can be used (Pulverisette 14, Pulverisette 16).

As used herein, "rpm" stands for "revolutions per minute".

DETAILED DESCRIPTION OF THE INVENTION

Process for the Preparation of a Boron Phosphide

The present invention first relates to a process for the preparation of a boron phosphide, more specifically BP and/or $B_{12}P_2$, comprising the mechanochemical reaction of boron phosphate (BPO$_4$) with at least one alkaline earth metal (EA).

More specifically, the present invention relates to a process for the preparation of a boron phosphide, wherein the process comprises the mechanochemical reaction of a powder of boron phosphate (BPO$_4$) mixed with a powder of at least one alkaline earth metal (EA) by a mechanical device providing mechanical energy which allows to initiate and carry out the mechanochemical reaction between the powder of boron phosphate (BPO4) and the powder of at least one alkaline earth metal (EA), for obtaining said boron phosphide, said boron phosphide being BP and/or $B_{12}P_2$.

In an advantageous embodiment, the process of the invention is carried out in a sealed device (or reaction tank).

Provided that enough mechanical energy is furnished to the system, the process of the invention (more specifically mechanochemical reaction of boron phosphate (BPO$_4$) with at least one alkaline earth metal (EA)) may be carried out without any external thermal heating. In such an embodiment, the temperature of the system is only determined by the initial temperature of the reagents, the optional thermal exchanges with the rest of the system, and the heating purely due to mechanical frictions. Preferably, the process of the invention (more specifically mechanochemical reaction of boron phosphate (BPO$_4$) with at least one alkaline earth metal (EA)) is carried out without any external thermal heating, the initial temperature of the starting reagents being room temperature, advantageously in a sealed device (or reaction tank). In this embodiment, the temperature inside the sealed device remains preferably below 80° C., for instance between 50° C. and 75° C. It is noteworthy that such a temperature does not allow initiating of a self-propagating high-temperature synthesis.

Without wishing to be bound by theory, in this new process, the temperature is not important. The energy required for the reaction is no longer supplied as in the SHS process by thermal energy, but by mechanical energy (mechanical energy dissipation, large plastic deformation, excess energy of elastic deformation, etc.). This allows the reaction to occur at low temperatures (<75° C.), to avoid oxidation associated with high temperatures and therefore to obtain exceptionally high yield compared to the SHS process.

Therefore, in a preferred embodiment, the temperature of the mechanochemical reaction is below 300° C.

The process of the invention (more specifically mechanochemical reaction of boron phosphate (BPO$_4$) with at least one alkaline earth metal (EA)) may be carried out under air or under an inert atmosphere (for instance under argon or nitrogen atmosphere). However, as the process of the invention does not involve high temperatures, undesired side-reactions, such as in particular undesired partial oxidation by air oxygen (in particular of the earth metal) do not significantly alter the overall yield of the process. Therefore, the process of the invention (more specifically mechanochemical reaction of boron phosphate (BPO$_4$) with at least one alkaline earth metal (EA)) is preferably carried out under air.

Mechanochemical Energy Source: Reaction Device

In the process of the invention, the mechanochemical reaction is advantageously carried out thanks to mechanical stresses between the powder of boron phosphate (BPO$_4$) and the powder of at least one alkaline earth metal (EA).

In other words, the mechanical energy is typically provided by shearing, stretching, and or grinding. Therefore, the mechanochemical reaction is preferably carried out with applying at least shear stresses, friction stresses and/or grinding stresses on a mixture comprising boron phosphate and the at least one alkaline earth metal. Preferably, the mixture comprising boron phosphate, the at least one alkaline earth metal and optional other reagents is a powdered mixture.

In other words, the mechanochemical reaction of the invention can be defined as a chemical reduction that is induced by the direct absorption of mechanical energy.

The process of the invention is for instance carried out in a device providing mechanical energy through translation or rotation. In particular, the process of the invention is carried out in a translation or rotative device. The temperature inside the device remains preferably below 80° C., for instance between 50° C. and 75° C.

The speed of the rotative device or of the translation device may vary or be constant. In case the speed of the rotative device or of the translation device varies over time, the variation may be continuous or not.

In a preferred embodiment, the process of the invention is carried out in a rotative device. A preferred rotative device is a mill, such as planetary mill, shaker mill, vibratory mill or attritor mill, advantageously a planetary mill. Advantageously, the mill used in the process of the invention is a high-energy mill.

In this embodiment, the process of the invention yields the boron phosphide as a powder. Preferably, the mechanochemical reaction of boron phosphate ($BPO_4$) with at least one alkaline earth metal (EA) is carried out in said mill with a rotation speed which allows to obtain a phosphide boron powder with a particle size of less than or equal to 100 nm, preferably less than or equal to 60 nm or more preferably less than or equal to 50 nm.

The reaction is typically performed by mixing boron phosphate, at least one alkaline earth metal, and optionally alkaline earth metal boride and/or the chemically inert diluent. Advantageously, boron phosphate, the at least one alkaline earth metal and optionally alkaline earth metal boride and/or the chemically inert diluent are mixed together and milled. The milling conditions are selected by the one of skill in the art so as to provide enough energy for the mechanochemical reaction to occur. In a preferred embodiment, the mechanical device is a rotative device and the rotation speed of the rotative device is between 50 and 1100 rpm. In particular, in the case of a mill, the rotation speed and/or the time of the milling step is selected so as to provide enough energy for the mechanochemical reaction to occur and go to completion.

The time during which the reagents (boron phosphate, at least one alkaline earth metal, and optionally $(EA)B_2$ and/or the chemically inert diluent) are milled depends in particular on the amount of said reagents. It can be readily determined by the person of skill in the art, for instance by analyzing the obtained powder so as to determine if the reaction has gone to completion. In the case of a mill, the time of the milling step is in particular also determined by the rotation speed of the mill. Advantageously, the milling step is carried out for a time of between 30 s and 15 min, preferably between 1 min and 10 min, for instance 1 min, 5 min or 7 minutes.

Advantageously, the process of the invention comprises a step of pre-milling boron phosphate, the at least one alkaline earth metal and optionally $(EA)B_2$ and/or the chemically inert diluent, so as to obtain a homogeneous mixture of the reagents as a fine powder, preferably with a particle size of between 1 and 200 µm.

The time during which the reagents (boron phosphate, at least one alkaline earth metal, and optionally alkaline earth metal boride and/or the chemically inert diluent) are pre-milled depends in particular on the amount of said reagents. It can be readily determined by the person of skill in the art, for example by measuring the particle size of the powder of reagents, which is typically of between 10 nm and 500 µm. In the case of a mill, the time of the pre-milling step is in particular determined by the rotation speed of the mill. Advantageously, the pre-milling step is carried out for a time between 30 s and 15 min, preferably between 1 min and 10 min, for instance 5 or 7 minutes.

In the embodiment wherein the process comprises a pre-milling step, the rotation speed of the mill is thus preferably different during the pre-milling step and during the milling step. Advantageously, the rotation speed of the mill is preferably greater during the milling step than during the pre-milling step. For instance, the rotation speed of the mill during the pre-milling step is of 100 rpm, while it is of 700 rpm during the milling step.

Once the reaction has come to completion, the boron phosphide (BP and/or $B_{12}P_2$) is separated from the other materials by methods known in the art, typically by washing with an acidic aqueous solution such as aqueous hydrochloric acid, nitric acid, sulfuric acid or aqua regia (mixture of concentrated nitric acid and hydrochloric acid, optimally in a volume ratio of 1:3 and water).

Preferably, the mixture obtained after completion of the reaction is crushed and washed with the acidic aqueous solution, preferably at elevated temperature, for example at the boiling temperature of the solution. Advantageously, the washed powder is then rinsed with water, and dried.

Particular Embodiment: Ball-Milling

In a particular embodiment, the process of the invention comprises a ball-milling step of a powder mixture comprising boron phosphate and the at least one alkaline earth metal.

In this embodiment, the mill is advantageously a high energy mill such as a high energy planetary mill. The temperature inside the mill remains preferably below 80° C., for instance between 50° C. and 75° C.

Ball-mills are available in different materials such as agate ($SiO_2$), silicon nitride, sintered corundum, zirconia (in particular tetragonal $ZrO_2$ stabilized with $Y_2O_3$), chrome steel, Cr—Ni steel, tungsten carbide, or polyamide. Preferably, the balls are metal balls, more preferably metal carbide balls, such as tungsten carbide balls, or metal oxide balls such as zirconia balls. The balls may also be in BP and/or $B_{12}P_2$.

Advantageously, the ball-to-powder weight ratio is of between 100:1 to 20:1. Preferably, the ball diameter is of between 0.5 mm and 20 mm, preferably between 5 mm and 15 mm, for example 10 mm.

In a particular embodiment, the process of the invention comprises the steps of:

(a) mixing boron phosphate, the at least one alkaline earth metal, optionally alkaline earth metal boride, and optionally a chemically inert diluent so as to obtain a mixed powder, (b) pre-milling with at least one ball said mixed powder at a first rotation speed of the ball-mill allowing for grinding the reagents for instance between 50 and 200 rpm, so as to obtain a pre-milled powder, in particular with a particle size of between 1 and 200 µm, (c) milling with at least one ball at a second rotation speed of the ball-mill enabling the reaction to occur, for instance between 400 rpm and 1100 rpm, preferably 700 rpm, for a time sufficient for the reaction to go to completion, so as to obtain a milled powder which comprises the boron phosphide, the second rotation speed being superior to the first rotation speed, (d) recovering boron phosphide from the milled powder.

In this embodiment, the "first rotation speed" corresponds to the rotation speed of the ball-mill during the pre-milling step, and the "second rotation speed" corresponds to the rotation speed of the ball-mill during the milling step.

In step (a), the reagents (boron phosphate, at least one alkaline earth metal, and optionally alkaline earth metal boride and/or the chemically inert diluent) are preferably provided as powders.

The time during which the reagents (boron phosphate, at least one alkaline earth metal, and optionally alkaline earth metal boride and/or the chemically inert diluent) are pre-milled (step b) depends in particular on the amount of said reagents, the rotation speed of the mill, and of the ball-to-powder weight ratio.

The time during which the reagents (boron phosphate, at least one alkaline earth metal, and optionally alkaline earth metal boride and/or the chemically inert diluent) are milled (step c) also depends in particular on the amount of said reagents, the rotation speed of the mill, and of the ball-to-powder weight ratio.

For instance, for a ball-to-powder weight ratio of between 100:1 to 20:1, the rotation speed of the pre-milling step (b) is of between 50 rpm and 200 rpm, for instance 100 rpm, and the pre-milling step (b) is preferably carried out at this speed for a time of between 30 s and 15 min, more preferably between 1 min and 10 min, advantageously for less than 5 minutes, for instance 1 min.

The conditions of the pre-milling step (b) are advantageously selected so as to achieve a particle size of the powder comprising the reagents of between 1 and 200 μm.

For instance, for a ball-to-powder weight ratio of between 100:1 to 20:1, the rotation speed of the milling step (c) is of between 400 rpm and 1100 rpm, preferably between 500 and 800 rpm, typically 700 rpm, and the milling (c) is preferably carried out at this speed for a time of between 30 s and 20 min, more preferably between 1 min and 15 min, advantageously for less than 10 minutes, such as 1 min, 5 min, 7 min.

Typically, step (d) comprises:
(d1) crushing the milled powder of step (c) so as to obtain a crushed powder,
(d2) treating the crushed powder of step (d1) in an acidic aqueous medium, so as to obtain a treated powder,
(d3) washing the treated powder of step (d2) with water, so as to obtain a washed powder, and
(d4) drying the washed powder of step (d3).

Examples of acidic aqueous medium are aqueous hydrochloric acid, nitric acid, sulfuric acid or aqua regia (mixture of concentrated nitric acid and hydrochloric acid, optimally in a volume ratio of 1:3 and water).

Alkaline Earth Metal

The "alkaline earth metal" is a periodic table group 2 metal selected from beryllium (Be), magnesium (Mg), calcium (Ca), strontium (Sr), barium (Ba) and radium (Ra). The at least one alkaline earth metal is advantageously calcium and/or magnesium, and is most preferably magnesium.

In the context of the present invention, the expression "at least one alkaline earth metal" is intended to mean one alkaline earth metal or a mixture of two or more alkaline earth metals. Advantageously, the reduction is performed with calcium, magnesium or a mixture of magnesium and calcium.

In a first embodiment, the process of the invention is used for the preparation of BP. In this embodiment, the process comprises the reduction of boron phosphate ($BPO_4$) with at least one alkaline earth metal (EA) according to reaction (1):

$$BPO_4 + 4EA \rightarrow BP + 4EA(O) \qquad (1).$$

In this embodiment, BP is preferably obtained with a purity of more than 95%, more preferably more than 97%.

In this first embodiment, the molar ratio of boron phosphate to the at least one alkaline earth metal is approximately 1:4. It is typically comprised between 1:3.5 and 1:4.5, advantageously between 1:3.8 and 1:4.2. Advantageously, a slight excess of the at least one alkaline earth metal relative to boron phosphate is used; the molar ratio of boron phosphate to the at least one alkaline earth metal is therefore advantageously comprised between 1:4.0 and 1:4.1, and is more preferably of 1:4.1.

By way of illustration, if two alkaline earth metals EA1 and EA2 are employed, a "molar ratio of boron phosphate to the at least one alkaline earth metal of 1:4" corresponds to 1 mole of boron phosphate to 4 moles of (EA1+EA2).

In a second embodiment, the process of the invention is used for the preparation of $B_{12}P_2$. In this embodiment, the process comprises the reduction of boron phosphate ($BPO_4$) with at least one alkaline earth metal (EA) according to reaction (2):

$$2BPO_4 + 5(EA)B_2 + 3EA \rightarrow B_{12}P_2 + 8EA(O) \qquad (2).$$

In this second embodiment, the molar ratio of boron phosphate ($BPO_4$)/alkaline earth metal boride (($EA)B_2$)/alkaline earth metal (EA) is around 2/5/3. It is typically comprised between 2/4.8/2.8 and 2/5.2/3.2, preferably between 2/5/3 and 2/5.1/3.1.

By way of illustration, if two alkaline earth metals EA1 and EA2 are employed, a "molar ratio of boron phosphate ($BPO_4$)/alkaline earth metal boride (($EA)B_2$)/alkaline earth metal (EA) 2/5/3" corresponds to 2 moles of boron phosphate/5 moles of (($EA1)B_2$+($EA2)B_2$))/3 moles of (EA1+EA2).

In a third embodiment, the process of the invention is used for the preparation of a mixture of BP and $B_{12}P_2$. The mixture comprises in particular between 5 wt % and 95 wt % (95 wt % excluded), preferably 10 wt % and 90 wt %, of BP with respect to the total weight of the powder, while it contains between 5 wt % and 95 wt %, preferably 10 wt % and 90 wt % of $B_{12}P_2$. The respective amounts of BP and $B_{12}P_2$ in the powder are in particular set by appropriate choice of the initial amounts of $BPO_4$, EA and ($EA)B_2$ introduced in the device before carrying out the process of the invention. Of note, both reactions (1) and (2) occur during this third embodiment of the process of the invention.

Chemically Inert Diluent

In a particular embodiment of the present invention, the energy provided to the system is lowered by further adding a chemically inert diluent to the mixture comprising boron phosphate and the at least one alkaline earth metal.

As used herein, a "chemically inert diluent" is a compound that does not chemically react with the reactants and/or the product (boron phosphide). In particular, the chemically inert diluent should be easily separable from the boron phosphide using for instance treatment methods commonly known in the art (for instance boiling the powder in an aqueous medium).

Preferably, the chemically inert diluent is an alkali chloride or an earth metal chloride, in particular LiCl, KCl, $MgCl_2$ and $CaCl_2$, preferably potassium chloride (KCl) or sodium chloride (NaCl). Advantageously, sodium chloride is used as the chemically inert diluent.

Therefore, in this particular embodiment, the mixture comprising boron phosphate and the at least one alkaline earth metal further comprises a chemically inert diluent, preferably sodium chloride.

The amount of chemically inert diluent is advantageously comprised between 40 and 60% by weight, more preferably around 50% by weight, of the total weight of the mixture of reactants (i.e. boron phosphate, at least one alkaline earth metal and optionally (EA)B$_2$) and chemically inert diluent.

The use of a chemically inert diluent is particularly preferred in the case where BP is sought, in particular with a high purity such as over 95% or over 97% purity. In this case, the type and amount of chemically inert diluent is chosen so as to absorb excess energy which would lead to undesired production of B$_{12}$P$_2$.

Boron Phosphide Obtained by the Process of the Invention

The process of the invention yields a boron phosphide, more specifically BP and/or B$_{12}$P$_2$, preferably in the form of a powder. Advantageously, the boron phosphide thus obtained consists essentially of BP and/or B$_{12}$P$_2$.

The particle size of the boron phosphide obtained by the process of the invention may be set in particular by appropriate choice of the mechanical energy provided to the system, notably through translation or rotation movements. When the process of the invention is carried out in a translation device, the particle size of the boron phosphide obtained by the process of the invention may be set in particular by appropriate choice of the acceleration of the milling step (step during which the mechanochemical reaction occurs). When the process of the invention comprises a ball-milling step, the particle size of the boron phosphide obtained by the process of the invention may be set in particular by appropriate choice of the rotation speed of the milling step (step during which the mechanochemical reaction occurs).

Moreover, in the case of BP, it has also been observed that increasing the amount of chemically inert diluent decreases the mean particle size of the obtained boron phosphide powder.

The particle size of boron phosphide obtained by the mechanochemical reaction is thus notably a function of: time of the mechanochemical reaction, speed, acceleration and/or rotation speed of the device used for carrying out the mechanochemical reaction, and the amount of chemically inert diluent optionally added in the mixture comprising boron phosphate and the at least one alkaline earth metal. More specifically, it is a function of the time of the mechanochemical reaction (which is preferably of between 30 seconds and 20 minutes), and of the amount of chemically inert diluent optionally added in the mixture comprising boron phosphate and the at least one alkaline earth metal.

Therefore, in a first embodiment, the boron phosphide powder obtained by the process of the invention is of nanometric size, that is to say that the boron phosphide powder has a particle size of less than or equal to 200 nm or 100 nm, preferably less than or equal to 60 nm, more preferably less than or equal to 50 nm (50 nm preferably excluded). For instance, the boron phosphide powder obtained by the process of the invention has a particle size of between 2 and 60 nm, advantageously between 15 and 45 nm, even more advantageously between 30 and 40 nm.

Advantageously, in this embodiment, the amount of chemically inert diluent is selected so as to obtain the boron phosphide (preferably BP) as a powder with a particle size of less than or equal to 200 nm or 100 nm, preferably less than or equal to 60 nm, more preferably less than or equal to 50 nm (50 nm preferably excluded). For instance, the boron phosphide powder obtained by the process of the invention has a particle size of between 10 and 90 nm or between 2 and 60 nm, advantageously between 15 and 45 nm, even more advantageously between 30 and 40 nm.

In particular, in this embodiment, the process of the invention is carried out in a device which has an acceleration (in particular when the process is carried out in a translation device) and/or a rotation speed (when the process is carried out in a rotative device) during the step in which the mechanochemical reaction of boron phosphate (BPO$_4$) with at least one alkaline earth metal (EA) occurs (or milling step in particular embodiments), said acceleration and/or a rotation speed being selected so as to obtain the boron phosphide as a powder with a particle size of less than or equal to 200 nm or 100 nm, preferably less than or equal to 60 nm, more preferably less than or equal to 50 nm (50 nm preferably excluded). For instance, the boron phosphide powder obtained by the process of the invention has a particle size of between 2 and 60 nm, advantageously between 15 and 45 nm, even more advantageously between 30 and 40 nm. When the process of the invention is carried out in a rotative device, the rotation speed of the milling step (c) is thus typically of between 400 rpm and 1100 rpm, preferably between 500 and 800 rpm, typically 700 rpm.

Advantageously, in this embodiment, the milling step (or step during which the mechanochemical reaction of boron phosphate (BPO$_4$) with at least one alkaline earth metal (EA) occurs) is carried out for a time sufficient to obtain the boron phosphide as a powder with a particle size of less than or equal to 200 nm or 100 nm, preferably less than or equal to 60 nm, more preferably less than or equal to 50 nm (50 nm preferably excluded). For instance, the boron phosphide powder obtained by the process of the invention has a particle size of between 2 and 60 nm, advantageously between 15 and 45 nm, even more advantageously between 30 and 40 nm. When the process of the invention is carried out in a rotative device, the milling (c) is thus preferably carried for a time of between 30 s and 20 min, more preferably between 1 min and 15 min, advantageously for less than 10 minutes, such as 1 min, 5 min, 7 min, preferably at a speed of between 400 rpm and 1100 rpm, preferably between 500 and 800 rpm, typically 700 rpm.

In particular, the boron phosphide powder obtained by the process of the invention may have a particle size between 60 nm excluded and 200 nm included, for instance between 60 nm excluded and 80 nm included.

In this first embodiment, a BP powder of nanometric size may be obtained, that is to say that the boron phosphide powder has a particle size of less than or equal to 200 nm or 100 nm, preferably less than or equal to 60 nm, more preferably less than or equal to 50 nm (50 nm preferably excluded). For instance, the boron phosphide powder of the invention has a particle size of between 2 and 60 nm, advantageously between 15 and 45 nm. In this embodiment, the purity of the BP powder is greater than 95%, preferably greater than 97%. The remaining of the powder consists essentially of B$_{12}$P$_2$.

A B$_{12}$P$_2$ powder of nanometric size may also be obtained, that is to say that the boron phosphide powder has a particle size of less than or equal to 200 nm or 100 nm, preferably less than or equal to 60 nm, more preferably less than or equal to 50 nm (50 nm preferably excluded). For instance, the boron phosphide powder of the invention has a particle size of between 2 and 60 nm, advantageously between 10 and 50 nm, more advantageously between 15 and 45 nm, even more advantageously between 30 and 40 nm. In this embodiment, the purity of the B$_{12}$P$_2$ powder is greater than 95%, preferably greater than 97%. The remaining of the powder consists essentially of BP.

In a second embodiment, the boron phosphide powder obtained by the process of the invention has a particle size greater than 200 nm, for instance between 200 nm excluded and 200 µm, in particular between 300 nm and 2 µm. Therefore, according to this second embodiment, a boron phosphide powder of micrometric size may be obtained.

Advantageous Embodiments

In a first particularly advantageous embodiment, the process of the invention allows for the preparation of BP in 95% purity or more, preferably in 97% purity or more. In this first embodiment, the process comprises a ball-milling step for reducing boron phosphate ($BPO_4$) with at least one alkaline earth metal (EA) according to reaction (1):

$$BPO_4 + 4EA \rightarrow BP + 4EA(O) \quad (1).$$

The at least one alkaline earth metal is advantageously calcium and/or magnesium, and is most preferably magnesium.

In this first embodiment, the molar ratio of boron phosphate to the at least one alkaline earth metal is approximately 1:4. It is typically comprised between 1:3.5 and 1:4.5, advantageously between 1:3.8 and 1:4.2. Advantageously, a slight excess of the at least one alkaline earth metal relative to boron phosphate is used; the molar ratio of boron phosphate to the at least one alkaline earth metal is therefore advantageously comprised between 1:4.0 and 1:4.1, and is more preferably of 1:4.1.

Preferably, the mixture comprising boron phosphate and the at least one alkaline earth metal further comprises a chemically inert diluent, preferably sodium chloride. The amount of chemically inert diluent is advantageously comprised between 40 and 60% by weight, more preferably around 50% by weight, of the total weight of the mixture of reactants (i.e. boron phosphate, at least one alkaline earth metal and optionally $(EA)B_2$) and chemically inert diluent).

Preferably, the balls are metal balls, more preferably metal carbide balls, such as tungsten carbide balls. Advantageously, the ball-to-powder weight ratio is of between 100:1 to 20:1. Preferably, the ball diameter is of between 0.5 mm and 20 mm, preferably between 5 mm and 15 mm, for example 10 mm.

Advantageously, in this first embodiment, the process of the invention comprises the steps of:

(a) mixing boron phosphate, the at least one alkaline earth metal, and optionally a chemically inert diluent (preferably provided as powders) so as to obtain a powder, (b) pre-milling with at least one ball at a first rotation speed allowing for grinding the reagents but not sufficient to initiate the mechanochemical reaction, for instance a speed of between 50 and 200 rpm, preferably between 75 and 150 rpm, in particular 100 rpm, so as to obtain a pre-milled powder, in particular with a particle size of between 1 µm and 200 µm, (c) milling with at least one ball at a second rotation speed enabling the reaction to occur, for a time sufficient for the reaction to go to completion, for instance a speed of between 400 and 1100 rpm, in particular 700 rpm, so as to obtain a milled powder, the second rotation speed being superior to the first rotation speed, (d) recovering boron phosphide from the milled powder.

The time during which the reagents (boron phosphate, at least one alkaline earth metal, and optionally the chemically inert diluent) are pre-milled (step b) depends on the targeted particle size of the reactant powder, and can be set in particular depending on the amount of said reagents, the rotation speed of the mill, and of the ball-to-powder weight ratio. The time during which the reagents (boron phosphate, at least one alkaline earth metal, and optionally the chemically inert diluent) are milled (step c) also depends in particular on the amount of said reagents, the rotation speed of the mill, and of the ball-to-powder weight ratio.

Preferably, step (d) comprises:

(d1) crushing the milled powder of step (c) so as to obtain a crushed powder, (d2) treating the crushed powder of step (d1) in an acidic aqueous medium (for instance an acidic aqueous medium as defined above), so as to obtain a treated powder, (d3) washing the treated powder of step (d2) with water, so as to obtain a washed powder, and (d4) drying the washed powder of step (d3).

In this first embodiment, the process (more specifically mechanochemical reaction of boron phosphate ($BPO_4$) with at least one alkaline earth metal (EA)) is preferably carried out without any external thermal heating. The temperature inside the mill remains preferably below 80° C., for instance between 50° C. and 75° C.

Moreover, in this first embodiment, the process (in particular the mechanochemical reaction of boron phosphate ($BPO_4$) with at least one alkaline earth metal (EA)) is carried out under air.

In a second particularly advantageous embodiment, the process of the invention allows for the preparation of $B_{12}P_2$ in 95% purity or more, preferably in 97% purity or more. In this second embodiment, the process comprises a ball-milling step for reducing boron phosphate ($BPO_4$) with at least one alkaline earth metal (EA) according to reaction (2):

$$2BPO_4 + 5(EA)B_2 + 3EA \rightarrow B_{12}P_2 + 8EA(O) \quad (2).$$

The at least one alkaline earth metal is advantageously calcium and/or magnesium, and is most preferably magnesium.

In this second embodiment, the molar ratio of boron phosphate ($BPO_4$)/alkaline earth metal boride ($(EA)B_2$)/alkaline earth metal (EA) is around 2/5/3. It is typically comprised between 2/4.8/2.8 and 2/5.2/3.2, preferably between 2/5/3 and 2/5.1/3.1.

In this second embodiment, the reaction mixture is advantageously devoid of any chemically inert diluent.

Preferably, the balls are metal balls, more preferably metal carbide balls, such as tungsten carbide balls. Advantageously, the ball-to-powder weight ratio is of between 100:1 to 20:1. Preferably, the ball diameter is of between 0.5 mm and 20 mm, preferably between 5 mm and 15 mm, for example 10 mm.

The balls may in particular be in BP and/or $B_{12}P_2$.

Advantageously, in this second embodiment, the process of the invention comprises the steps of:

(a) mixing boron phosphate, the at least one alkaline earth metal, and the alkaline earth metal boride (preferably provided as powders) so as to obtain a powder, (b) pre-milling at a speed with at least one ball allowing for grinding the reagents but not sufficient to initiate the mechanochemical reaction, for instance a first rotation speed of between 50 and 200 rpm, preferably between 75 and 150 rpm, in particular 100 rpm, so as to obtain a pre-milled powder, in particular with a particle size of between 1 µm and 200 µm, (c) milling at a speed enabling the reaction to occur with at least one ball, for a time sufficient for the reaction to go to completion, for instance a second rotation speed of between 400 and 1100 rpm, in particular 700 rpm, so as to obtain a milled powder, the second rotation speed being superior to the first rotation speed, (d) recovering boron phosphide from the milled powder.

The time during which the reagents (boron phosphate, at least one alkaline earth metal, alkaline earth metal boride, and optionally the chemically inert diluent) are pre-milled (step b) depends on the targeted particle size of the reactant powder, and can be set in particular depending on the amount of said reagents, the rotation speed of the mill, and of the ball-to-powder weight ratio. The time during which the reagents (boron phosphate, at least one alkaline earth metal, alkaline earth metal boride, and optionally the chemically inert diluent) are milled (step c) also depends in particular on the amount of said reagents, the rotation speed of the mill, and of the ball-to-powder weight ratio.

Preferably, step (d) comprises:

(d1) crushing the milled powder of step (c) so as to obtain a crushed powder, (d2) treating the crushed powder of step (d1) in an acidic aqueous medium (for instance an acidic aqueous medium as defined above), so as to obtain a treated powder, (d3) washing the treated powder of step (d2) with water, so as to obtain a washed powder, and (d4) drying the washed powder of step (d3).

In this second embodiment, the process (more specifically the mechanochemical reaction of boron phosphate ($BPO_4$) with at least one alkaline earth metal (EA) and alkaline earth metal boride) is preferably carried out without any external thermal heating. The temperature inside the mill remains preferably below 80° C., for instance between 50° C. and 75° C.

In this second embodiment, the process (in particular the mechanochemical reaction of boron phosphate ($BPO_4$) with at least one alkaline earth metal (EA) and alkaline earth metal boride) is carried out under air.

Boron Phosphide Powder

The present invention further relates to a boron phosphide, more specifically BP and/or $B_{12}P_2$, in particular obtainable by the process of the invention.

The boron phosphide of the invention is preferably in the form of a powder.

Advantageously, the boron phosphide of the invention, in particular the boron phosphide powder of the invention, consists essentially of BP and/or $B_{12}P_2$.

In a first embodiment, the boron phosphide powder of the invention is of nanometric size, that is to say that the boron phosphide powder has a particle size of less than or equal to 200 nm or 100 nm, preferably less than or equal to 60 nm, more preferably less than or equal to 50 nm. For instance, the boron phosphide powder of the invention has a particle size of between 10 nm and 90 nm, or between 2 and 60 nm, advantageously between 15 and 45 nm, more advantageously between 30 and 40 nm.

In particular, the boron phosphide powder of the invention may have a particle size between 60 nm excluded and 200 nm included, for instance between 60 nm excluded and 80 nm included.

In this first embodiment, the invention in particular relates to a BP powder of nanometric size, that is to say that the boron phosphide powder has a particle size of less than or equal to 200 nm or 100 nm, preferably less than or equal to 60 nm, more preferably less than or equal to 50 nm (50 nm preferably excluded). For instance, the boron phosphide powder of the invention has a particle size of between 2 and 60 nm, advantageously between 15 and 45 nm, more advantageously between 30 and 40 nm. In this embodiment, the purity of the BP powder is greater than 95%, preferably greater than 97%. The remaining of the powder consists essentially of $B_{12}P_2$.

In this first embodiment, the invention also relates to a $B_{12}P_2$ powder of nanometric size, that is to say that the boron phosphide powder has a particle size of less than or equal to 200 nm or 100 nm, preferably less than or equal to 60 nm, more preferably less than or equal to 50 nm (50 nm preferably excluded). For instance, the boron phosphide powder of the invention has a particle size of between 2 and 60 nm, advantageously between 10 and 60 nm, more advantageously between 15 and 45 nm, even more advantageously between 30 and 40 nm. In this embodiment, the purity of the $B_{12}P_2$ powder is greater than 95%, preferably greater than 97%. The remaining of the powder consists essentially of BP.

In a second embodiment, the boron phosphide powder of the invention has a particle size greater than 200 nm, for instance between 200 nm excluded and 200 µm, in particular between 300 nm and 2 µm. Therefore, according to this second embodiment, the invention may relate to a boron phosphide powder of micrometric size.

DESCRIPTION OF THE FIGURES

FIG. 1. Pressure and temperature variation in the vial during the milling step of the process of the invention, using (a) $BPO_4$ and Mg (60 sec real time milling) and (b) $BPO_4$, Mg and $MgB_2$ (120 sec real time milling). The left Y-axis represents the pressure in bar, the right Y-axis represents the temperature in K, and the X-axis represents the time in seconds.

FIG. 2. Diffraction pattern (CuKα) of the washed sample of (a) BP (cubic) and (b) $B_{12}P_2$ (icosahedral) produced by the process of examples. The arrow shows the location of 104 and 021 diffraction lines of $B_{12}P_2$. The X-axis represents the value 2θ in degrees.

FIG. 3. Representative TEM micrographs of the washed sample of (a) BP (cubic) and (b) $B_{12}P_2$ (icosahedral) produced by mechanochemical process of the invention.

FIG. 4. Representative SEM micrographs (10000×) of the washed sample of (a) BP (cubic) and (b) $B_{12}P_2$ (icosahedral) produced by mechanochemical process of the invention.

FIG. 5 Raman spectra of the washed sample of (a) BP (cubic) and (b) $B_{12}P_2$ (icosahedral) produced by mechanochemical process of the invention. The arrow points to the characteristic band of $B_{12}P_2$ (476 $cm^{-1}$). Insets show optical images (100×) of the sample surfaces. The X-axis represents the Raman shift in $cm^{-1}$.

EXAMPLES

The following examples aim at illustrating particular embodiments of the present invention, and thus should not be construed as limiting in any way the scope of the present invention.

Chemicals

Boron phosphate ($BPO_4$) was produced according to the procedure described in Handbuch der Praparativen Anorganischen Chemie (von G. Brauer, Ed.) vol. 2, pp. 811, Stuttgart: Ferdinand Enke Verlag, 1975:

Reaction of boric acid (Alfa Aesar, 99.8%) with orthophosphoric acid (Alfa Aesar, 85% aq. sol.) in alumina crucible at 520 K with subsequent annealing of the obtained product in a muffle furnace at 770 K yields $BPO_4$ in 98-99% yield, as a powder with a particle size of less than 200 µm.

Magnesium metal (Alfa Aesar, 99.8%; −325 mesh) and magnesium diboride (Alfa Aesar, 99%, −100 mesh) were used as starting materials.

Protocol

The stoichiometric amounts of $BPO_4$ (powder with a particle size of less than 200 μm.), Mg and $MgB_2$ were thoroughly mixed in an agate mortar, according to equation (1') or (2'):

$$BPO_4 + 4Mg \rightarrow BP + 4MgO \quad (1')$$

$$2BPO_4 + 5MgB_2 + 3Mg \rightarrow B_{12}P_2 + 8MgO \quad (2').$$

Therefore, when production of BP is sought for, the molar ratio $BPO_4/Mg$ is 1:4. When production of $B_{12}P_2$ is sought for, the molar ratio $BPO_4/MgB_2/Mg$ is 2/5/3.

Mechanochemical syntheses were carried out in a commercial high-energy planetary ball mill (Fritsch, Pulverisette 7). The milling container was a hardened steel vial with a capacity of 80 ml, and 25 tungsten carbide balls with a diameter of 10 mm (for a total weight of 198 g) were used. Ball-to-powder weight ratio was varied from 100:1 to 20:1. Of note, the ball-to-powder ratio did not have significant influence on the outcome of the process, in particular in terms of yield, particle size and purity of the obtained powders.

Loading/unloading operations and milling were performed in air. Typically, the raw mixture of starting materials was pre-milled with a rotation speed of 100 rpm during 1 min, then the rotation speed was increased up to 700 rpm (see Tables 1 and 2) for 1, 2, 5 or 7 minutes. Milling under high speed (700 rpm) was continually conducted for 1 to 5 minutes. After milling, the resulting powders were extracted, subsequently treated with diluted hydrochloric acid (Alfa Aesar, 10% aqueous solution), washed several times with deionized water, and dried in air at 323 K. In some experiments sodium chloride (Prolabo, 99.5%, −100 μm) was used as chemically inert diluent (see Tables 1 and 2).

Characterization

In situ monitoring of pressure and temperature during milling was achieved by incorporating a gas-temperature measurement system based on pressure and temperature sensors as well as a transmitter into the vial lid and a receiver, external to the mill, sending the data to a computer.

The washed samples were studied by X-ray powder diffraction (Equinox 1000, Inel powder diffractometers with CuKα1 λ=1.540598 Å and CoKα1 radiation λ=1.789007 Å). The particle size of the produced powders was calculated from the width of X-ray diffraction lines using Williamson-Hall method (see Williamson et al. *Acta Metall.*, 1953, vol. 1, pp. 22-31).

Raman spectra were excited by 632.8 nm He—Ne laser (beam size ~10 μm) and recorded on a Horiba Jobin Yvon HR800 micro-Raman spectrometer.

Particles sizes and microstructural morphology of boron phosphides powders were examined by scanning electron microscopy (SEM) at a Leo Supra 40 and 50VP instruments, and by transmission electron microscopy (TEM) at a Leo 912AB Omega.

The chemical composition and purity of the samples were revealed by energy dispersive X-ray (EDX) microanalysis (performed in Leica S440 electron microscope with a Princeton Gamma-Tech energy-dispersive spectrometer and LEO Supra 50VP electron microscope with Oxford Instruments INCA Energy+ microanalytical system). According to the quantitative EDX microanalysis, the samples of boron phosphides did not show any detectable non-stoichiometry.

Specific surface areas (SSA) were measured using the Brunauer-Emmett-Teller (BET) method (see Brunauer, Emmett, and Teller, *J. Am. Chem. Soc.*, 1938, vol. 60, pp. 309-319) by nitrogen adsorption on a Coulter SA 3100.

Particles size distributions (for a few samples) were calculated from static light scattering (SLS) experiments carried out on a Fritsch Analysette 22 NanoTec plus.

Results

The obtained results are summarized in tables 1 (for BP) and 2 (for $B_{12}P_2$) below.

TABLE 1

Milling conditions of key experiments for cubic BP producing and results of X-ray analysis

| Starting composition $BPO_4/Mg/NaCl$ (g) | Pre-milling step | Milling step | XRD phases after milling and washing (in % by weight of the solid) | Yield | Crystalline size[1] (nm) | SSA ($m^2/g$) |
|---|---|---|---|---|---|---|
| 1.06/0.96/0.00 | 100 rpm 1 min | 700 rpm 1 min | BP (90%) $B_{12}P_2$ (10%) | 72% | 80(7) | — |
| 2.12/2.00/0.00 | 100 rpm 1 min | 700 rpm 1 min | BP (95%) $B_{12}P_2$ (5%) | 76% | 78(8) | — |
| 1.59/1.50/1.55 | 100 rpm 1 min | 700 rpm 1 min | BP (97%) $B_{12}P_2$ (3%) | 65% | 65(9) | 18.7 |
| 1.06/0.98/2.54 | 100 rpm 1 min | 700 rpm 5 min | BP (97%) $B_{12}P_2$ (3%) | 75% | 59(7) | 33.6 |
| 2.12/1.92/4.04 | 100 rpm 1 min | 700 rpm 5 min | BP (98%) $B_{12}P_2$ (2%) | 75% | 67(5) | 33.7 |
| 3.18/2.88/4.03 | 100 rpm 1 min | 700 rpm 5 min | BP (97%) $B_{12}P_2$ (3%) | 75% | 53(7) | 10.1 |

[1]The crystalline size corresponds to the particle size of the obtained powder. The first number corresponds to the measure particle size, while the number in parenthesis indicates the uncertainty. The uncertainty applies to the least significant figure(s) of the number prior to the parenthesized value.

TABLE 2

Milling conditions of key experiments for $B_{12}P_2$ producing and results of X-ray analysis

| Starting composition $BPO_4$/Mg/MgB$_2$ (g) | Pre-milling step | Milling step | XRD phases after milling and washing (in % by weight of the solid) | Yield | Crystalline size1 (nm) | SSA (m$^2$/g) |
|---|---|---|---|---|---|---|
| 1.06/0.00/1.32 | 100 rpm 1 min | 700 rpm 7 min | initial substance only | — | — | — |
| 1.06/0.37/1.15 | 100 rpm 1 min | 700 rpm 1 min | BP (20%) $B_{12}P_2$ (80%) | 67% | 32(6) | — |
| 2.12/0.73/2.76 | 100 rpm 1 min | 700 rpm 2 min | BP (3%) $B_{12}P_2$ (97%) | 84% | 32(6) | 27.3 |

1The crystalline size corresponds to the particle size of the obtained powder. The first number corresponds to the measure particle size, while the number in parenthesis indicates the uncertainty. The uncertainty applies to the least significant figure(s) of the number prior to the parenthesized value.

DISCUSSION

Figure 1:
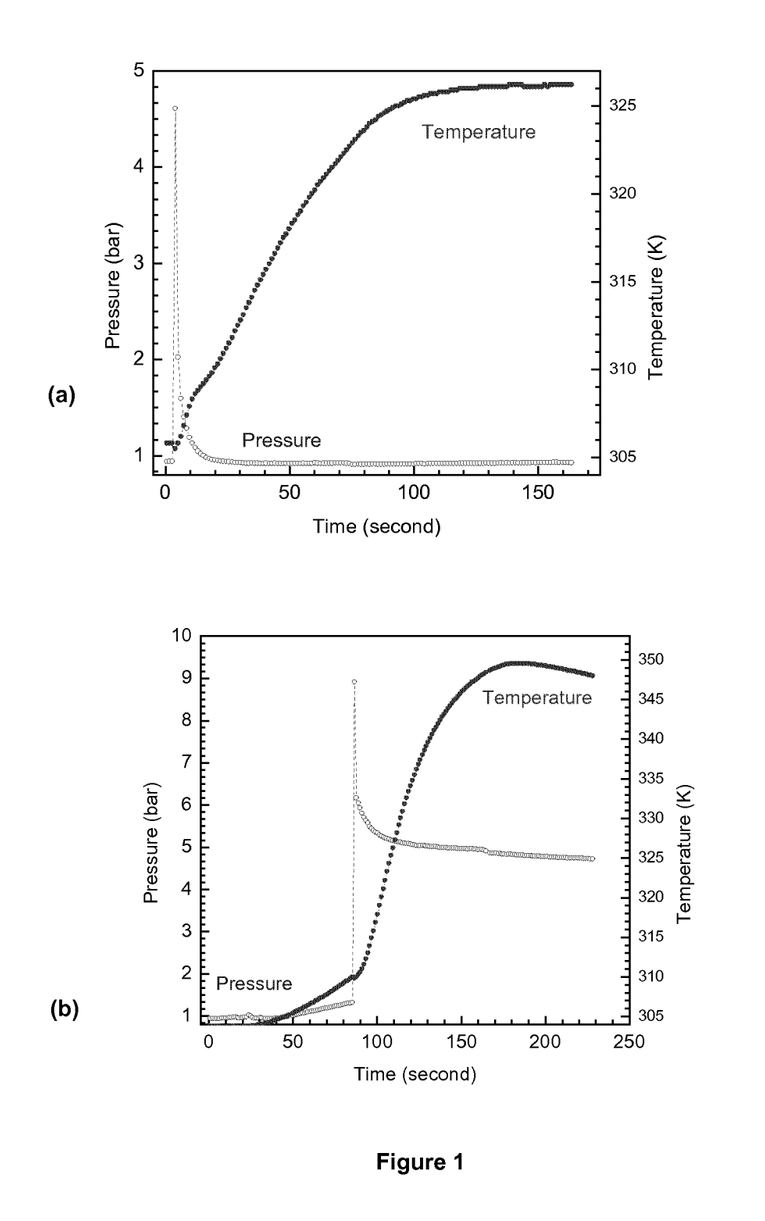

FIGS. 1a (production of BP) and 1b (production of $B_{12}P_2$) show a typical variation of the gas pressure and the integrated temperature in the reaction tank after setting the rotation speed to 700 rpm with the corresponding holding time (see tables 1 and 2) for the milling step. The small increase of the temperature in the reaction tank gave a corresponding signal of the sensitive gas pressure sensor. In the few first seconds, the temperature and pressure are stable. A sharp pressure peak of about 4 (FIG. 1a)-9 (FIG. 1b) bars is observed, reflecting the start of an exothermal reaction in the powder mixture. The incubation period, i.e. the milling time under high speed up to this peak, is 6-20 seconds in the case of the reaction according to equation (1'), and without any addition of chemically inert diluent (i.e. with pure $BPO_4$ and Mg, FIG. 1a). This incubation time is increased up to 160-220 seconds upon addition of a chemically inert diluent (sodium chloride). The incubation time is also increased in the case of production of $B_{12}P_2$ (see FIG. 1b). The pressure peak could be attributed to the presence of water (not more than 0.4 wt %) in initial $BPO_4$. Alternatively, the pressure peak could correspond to the formation of small amounts of gaseous products as a result of side reactions in the experimental mixture (perhaps elemental phosphorus). This second hypothesis seems more accurate, as it would explain the light phosphorus smell identified after unloading.

As can be seen in FIG. 1a, the integrated temperature increased during milling from 306 K to 323 K. Two sections are clearly visible on the graph. In the first section, the slope is of 0.50 K/sec, and in the second section, it is of 0.27 K/sec. Of note, in the control experiment wherein $BPO_4$ was loaded without Mg, the temperature slowly increases with a rate of about 0.02 K/sec, which may be explained by internal friction and impact phenomena. The temperature curves show a similar trend for all the trials.

Similar results are observed regarding the integrated temperature during milling of the mixture of $BPO_4$, Mg, $MgB_2$, (leading to $B_{12}P_2$), as can be seen in FIG. 1b, which increased from 306 K to around 350 K.

The product obtained according to reaction (1') (after washing) proved to be solid boron phosphide, comprising up to 10% of boron subphosphide, $B_{12}P_2$. More specifically, the BP powder produced according to the invention, and in particular according to the present examples, may contain following impurities: (i) products of side reactions (mainly $B_{12}P_2$, below 3 wt %), (ii) elemental amorphous boron and phosphorus, which may however be removed upon treatment with aqueous nitric acid and (iii) very small amounts of impurities from the mill device (milling balls and vial).

Figure 2:
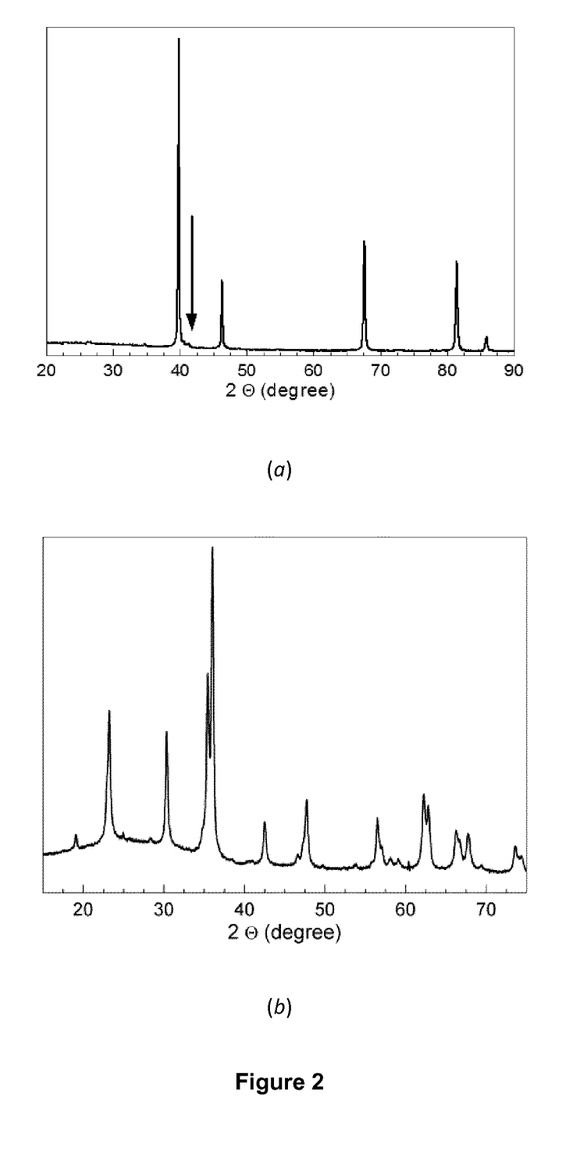
Figure 3:
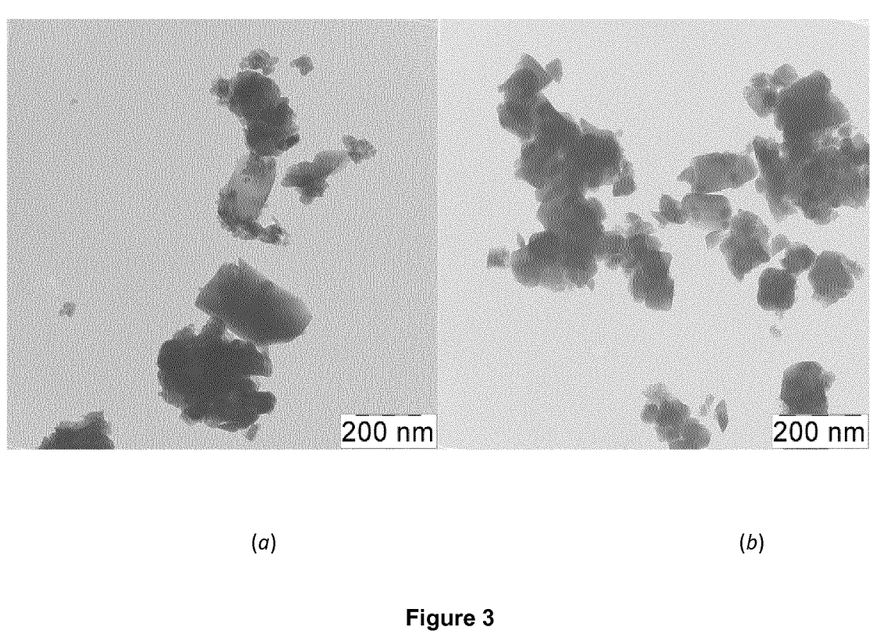
Figure 4:
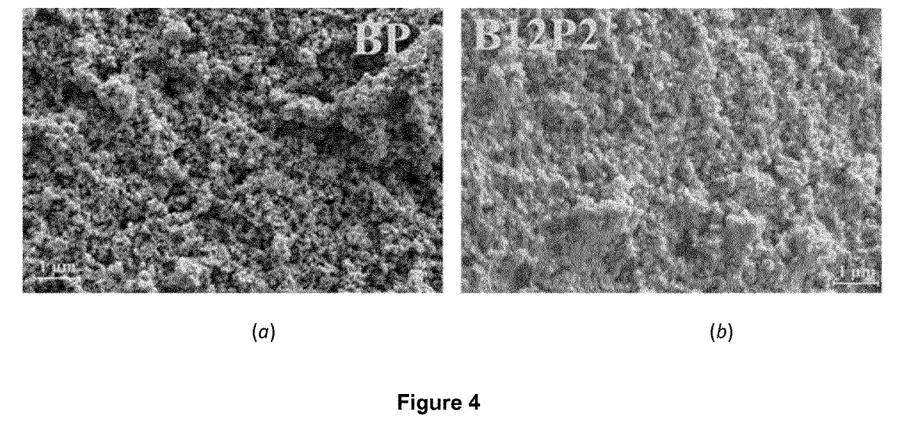
Figure 5:
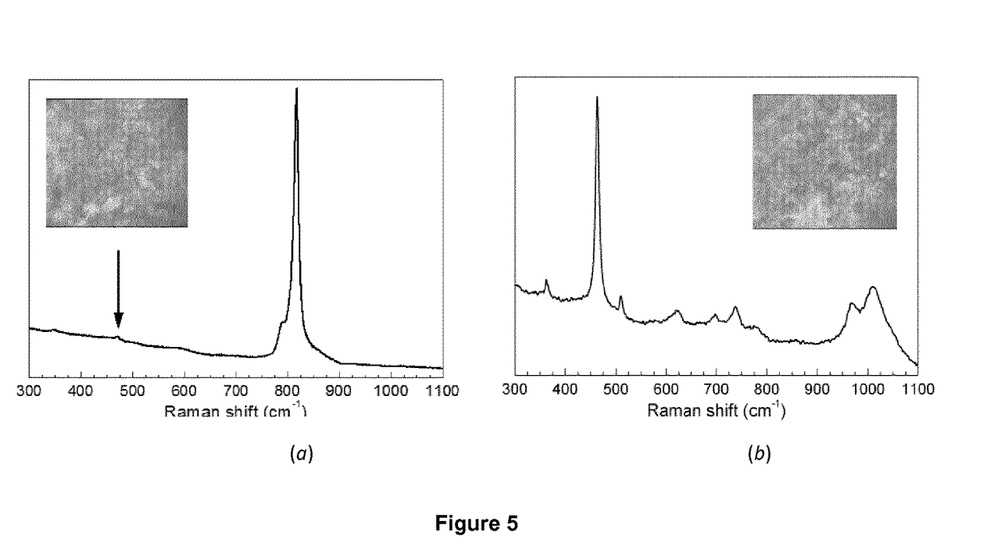

To reduce the excess of Gibbs energy caused by mechanical energy transfer, sodium chloride, a chemically inert diluent, was added to the reagents. Indeed, upon addition of NaCl to the reaction mixture, a decrease in the intensity of the $B_{12}P_2$ diffraction lines in the final products was observed. In particular, with a NaCl content of 33 wt %, the formation of the almost single-phase (>97%) boron phosphide is observed (FIG. 2a), with a lattice parameter of a=4.545(2) Å, which is close to the literature value (4.543(1) Å (Xiam et al. *J. Appl. Phys.*, 1993. vol. 74, pp. 1660-1662)). The obtained final powder exhibited a mean particle size of 100-200 nm (FIGS. 3a and 4a). The Raman spectra (FIG. 5a) of the washed reaction (1') products exhibits two features: a strong asymmetric line at ~818 cm$^{-1}$ and a weak broad line at ~804 cm$^{-1}$ that are characteristic bands for BP. In some BP samples, a weak sharp line at ~476 cm$^{-1}$ (the most intense band of $B_{12}P_2$) was also observed.

The product obtained according to reaction (2') (after washing) proved to be solid boron subphosphide ($B_{12}P_2$) almost as a single phase rhomboedric $B_{12}P_2$ (>97%, FIG. 2b), comprising up to 3 wt % of boron phosphide BP. Of note, under unoptimized conditions, the obtained solid boron subphosphide ($B_{12}P_2$) comprises up to 20 wt % of boron phosphide BP. More specifically, the $B_{12}P_2$ powder produced according to the invention, and in particular according to the present examples, may contain: (i) products of side reactions (mainly BP, below 3 wt %), (ii) elemental amorphous boron, which may however be removed upon treatment with aqueous nitric acid, (iii) trace of magnesium borides and (iv) very small amounts of impurities from the mill device (milling balls and vial).

$B_{12}P_2$ lattice parameters of a=5.992(4) Å, c=11.861(8) Å were found, which are a good agreement with the literature values (a=5.986(6) Å, c=11.848(9) Å (Slack et al. *J. Phys. Chem. Solids*, 2014, vol. 75, pp. 1054-1074)). The obtained final powder exhibited a mean particle size of 100-200 nm (FIGS. 3b and 4b). The Raman spectrum (FIG. 5b) of the washed reaction (2') products exhibits all of the expected peaks for $B_{12}P_2$, in particular the strong asymmetric line at ~476 cm$^{-1}$ corresponding to the most intense band of $B_{12}P_2$.

The total yield of boron phosphides is of about 75%, according to reactions (1') and (2'). The lower yields observed in reactions with high contents of chemically inert diluent (NaCl) demonstrate that when the content of chemically inert diluent (NaCl) is high, the reaction is slower, so that in the reaction conditions of the above examples the reaction did not go to completion.

CONCLUSION

In sum, single-phase boron phosphides BP and $B_{12}P_2$ powders have been produced by reduction of boron phosphate by metallic magnesium (BP), or metallic magnesium and magnesium diboride ($B_{12}P_2$), through a mechanochemical method, i.e. high energy ball milling.

As demonstrated, the method of the invention is characterized by easy implementation, high efficiency, low cost, and good perspectives for large-scale production of BP and/or $B_{12}P_2$.

The invention claimed is:

1. A process for the preparation of a boron phosphide, wherein the process is a mechanochemical reaction of a powder of boron phosphate ($BPO_4$) mixed with a powder of at least one alkaline earth metal (EA) by a mechanical device providing mechanical energy which allows to initiate and carry out the mechanochemical reaction between the powder of boron phosphate (BPO4) and the powder of at least one alkaline earth metal (EA), for directly obtaining said boron phosphide without any external thermal heating, said boron phosphide being BP and/or $B_{12}P_2$, and the mechanochemical reaction is carried out in a mill.

2. The process of claim 1, wherein the mechanochemical reaction is carried out thanks to mechanical stresses between the powder of boron phosphate (BPO4) and the powder of at least one alkaline earth metal (EA).

3. The process of claim 1, wherein the temperature of the reaction is below 80° C.

4. The process of claim 1, wherein the particle size of the boron phosphide obtained by the mechanochemical reaction is a function of the time of the mechanochemical reaction between, which is between 30 s and 20 min.

5. The process of claim 1, wherein the mechanical device is a rotative device and the rotation speed of the rotative device is between 50 and 1100 rpm.

6. The process of claim 5, wherein the mechanochemical reaction comprises a ball-milling step of a powder mixture comprising boron phosphate and the at least one alkaline earth metal.

7. The process of claim 1, wherein the mechanochemical reaction is carried out in air.

8. The process of claim 1, wherein the boron phosphide is BP, and the process comprises the reduction of boron phosphate ($BPO_4$) with at least one alkaline earth metal (EA) according to mechanochemical reaction (1):

$$BPO_4 + 4\ EA \rightarrow BP + 4\ EA(O) \quad (1).$$

9. The process of claim 1, wherein the boron phosphide is $B_{12}P_2$, and the process comprises the reduction of boron phosphate ($BPO_4$) with at least one alkaline earth metal (EA) according to mechanochemical reaction (2):

$$2BPO_4 + 5(EA)B_2 + 3EA \rightarrow B_{12}P_2 + 8EA(O) \quad (2).$$

10. The process of claim 1, wherein the at least one alkaline earth metal is magnesium and/or calcium.

11. The process of claim 1, wherein the mixture comprising boron phosphate and the at least one alkaline earth metal further comprises a chemically inert diluent.

12. The process of claim 6, wherein it comprises:
   (a) mixing boron phosphate, the at least one alkaline earth metal, optionally alkaline earth metal boride, and optionally a chemically inert diluent, provided as powders, so as to obtain a mixed powder,
   (b) pre-milling said mixed powder with at least one ball at a first rotation speed of the ball-mill of between 50 and 200 rpm allowing for grinding the reagents,
   (c) milling said pre-milled powder with at least one ball at a second rotation speed of the ball mill of between 400 and 1100 rpm enabling the reaction to occur, so as to obtain a milled powder which comprises the boron phosphide, the second rotation speed being superior to the first rotation speed,
   (d) recovering boron phosphide from the milled powder.

13. The process of claim 10, wherein the at least one alkaline earth metal is magnesium.

14. The process of claim 11, wherein the chemically inert diluent is sodium chloride.

* * * * *